Sept. 26, 1950 J. J. DELANY 2,523,864
VALVE AND CLOSURE THEREFOR
Filed July 23, 1947
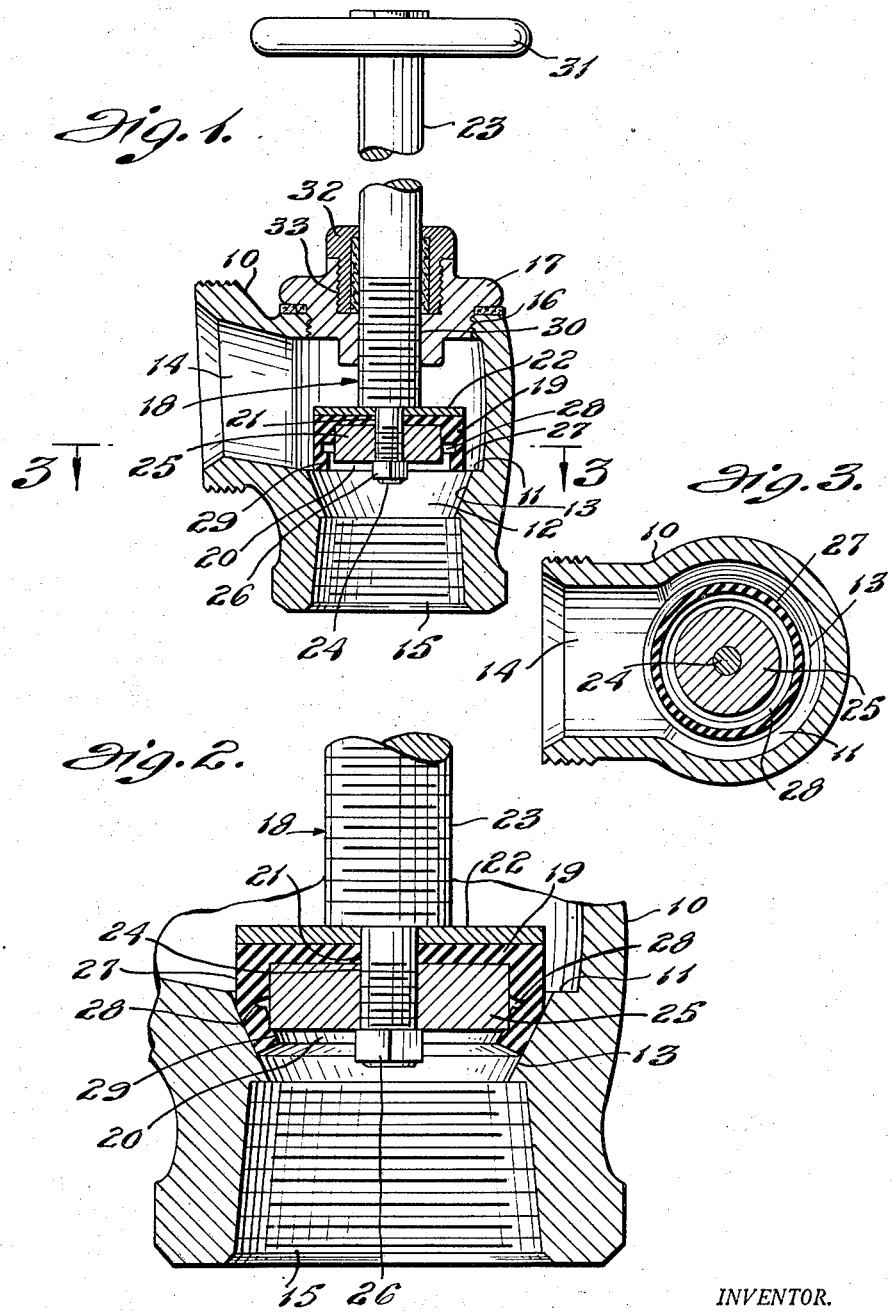
INVENTOR.
JOHN J. DELANY
BY
Clark & Ott
ATTORNEYS Patented Sept. 26, 1950

2,523,864

UNITED STATES PATENT OFFICE 2,523,864

VALVE AND CLOSURE THEREFOR

John J. Delany, Brooklyn, N. Y., assignor to Delany Realty Corporation, New York, N. Y., a corporation of New York Application July 23, 1947, Serial No. 763,076

5 Claims. (Cl. 251—27)

This invention relates to valves having conical shaped valve seats such as flush valves, shut-off valves, siphon valves, faucets and the like and the invention has particular reference to a valve closure therefor which is so constructed and arranged as to insure snug engagement against the conical shaped seat when moved to closed relation so as to positively shut off the flow through the valve.

The invention has for an object the provision of a valve of the indicated character having a valve closure which is capable of flexing and bending inwardly into alignment with and impinging relation against the conical shaped valve seat to thereby shut off the flow through the valve.

Still another object of the invention is the provision of a valve closure including a flexible resilient member disposed in surrounding relation with a hard cylindrical backing and having an annular recess in the inner periphery thereof spaced from said backing and which member functions to bend on itself annularly about said recess into impinging relation against the conical shaped valve seat and between the same and the backing when moved to closed relation.

With the foregoing and other objects in view, reference is now made to the following specification and accompanying drawings in which an embodiment of the invention is illustrated.

In the drawings:

Fig. 1 is a vertical sectional view through a valve constructed in accordance with the invention and illustrating the valve closure in open relation.

Fig. 2 is an enlarged fragmentary sectional view showing the valve closure in closed relation.

Fig. 3 is a horizontal sectional view taken approximately on line 3—3 of Fig. 1.

Referring to the drawings by characters of reference, 10 designates a valve casing, herein illustrated as part of a shut off valve but which within the scope of the invention may be any type of valve structure having a partition 11 provided with a frusto-conical shaped opening 12 defining a valve port and forming a frusto-conical seat 13.

The valve casing 10 is formed with an inlet 14 and an outlet 15 communicating respectively with the hollow interior of the valve on opposite sides of the partition 11. In alignment with the opening 12 the valve casing 10 is formed with a threaded opening 16 in which is secured a screw cap 17.

In order to provide means for insuring complete shutting off of the flow through the valve, a reciprocatory valve closure 18 is provided which consists of a cylindrical shaped flexible resilient element 19 having an annular recess 20 opening through one end thereof and a reduced aperture 21 opening into said recess and through the opposite end. The flexible resilient element 19 is mounted on a flat head 22 formed at the inner end of a valve stem 23 having a short screw stud 24 protruding through the aperture 21 in said resilient flexible member and through a hard backing member 25 such as an apertured metallic disk located within the annular recess 20 and secured against the bottom wall thereof by a nut 26 which holds the flexible resilient element 19 on the valve stem 23.

The peripheral wall 27 of the flexible resilient element 19 formed by the recess 20 therein is provided with a groove 28 located medially of the depth of said recess and extending annularly about the peripheral face thereof. Between the groove 28 and the end of the peripheral wall 27 the said wall is reduced in thickness so that the peripheral face 29 between the groove 28 and the end of the said wall is normally spaced from the outer periphery of the backing member 25. The said backing member is located inwardly of the end of the peripheral wall 27 and snugly fits the recess 20 inwardly of the groove 28.

This provides a construction by which the outer portion of the peripheral wall 27 will bend inwardly on itself about the recess 28 when the valve closure is moved to closed relation against the conical shaped seat 13 whereby the outer annular face of the peripheral wall 27 from the end thereof to the recess 28 will align with and impinge against the seat 13 and the inner annular face 29 thereof will impinge against the backing member 25 as illustrated in Fig. 2 of the drawings. The alignment of the outer portion of the peripheral wall 27 with the seat 13 is rendered possible by the groove 28 in the inner face thereof which groove is distorted as shown in Fig. 2 of the drawings when the valve closure is moved to closed relation. This provides a snug engagement of the valve closure 18 against the frusto-conical seat 13 so as to shut off the flow of fluid through the valve.

The valve stem 23 is threadedly engaged in a threaded opening 30 in the screw cap 17 and the protruding end thereof is provided with a handle member 31 for turning the valve closure 18 for imparting reciprocatory movement toward and away from the frusto-conical seat 13. A packing gland nut 32 is threadedly engaged in an opening 33 in the screw cap 17 in surrounding relation with the shank of the valve stem 23 for preventing leakage of the fluid about the valve stem.

What is claimed is:

1. In a valve having a frusto-conical valve seat forming a valve port, a closure member mounted in said valve for reciprocatory movement toward and away from said valve seat, said closure member including a cylindrical flexible resilient element having an annular recess opening through one end thereof defining a peripheral wall, said peripheral wall having a groove in the inner periphery thereof extending annularly about the recess and said wall being reduced in thickness between said groove and the outer end thereof, a hard annular backing member fitted in said recess inwardly of said groove and with the outer portion thereof spaced from the inner face of said wall from said groove to the outer end of said wall and said flexible resilient element functioning to bend inwardly on itself about said groove when moved to closed relation against said seat whereby the outer portion of said element will align with said seat and be impinged between the seat and the outer portion of said backing member.

2. In a valve having a frusto-conical valve seat forming a valve port, a closure member mounted in said valve for reciprocatory movement toward and away from said valve seat, said closure member including a cylindrical flexible resilient element having an annular recess opening through one end thereof defining a peripheral wall, said peripheral wall having a groove in the inner periphery thereof extending annularly about the recess, a hard annular backing member fitted in said recess inwardly of said groove and with the outer portion thereof spaced from the inner face of said wall from said groove to the outer end of said wall and said flexible resilient element functioning to bend inwardly on itself about said groove when moved to closed relation against said seat whereby the outer portion of said element will align with said seat and be impinged between the seat and the outer portion of said backing member.

3. In a valve having a frusto-conical valve seat forming a valve port, a closure member mounted in said valve for reciprocatory movement toward and away from said valve seat, said closure member including a flexible resilient element having a recess opening through one end thereof defining a peripheral wall, said peripheral wall having a groove in the inner periphery thereof extending about the recess and said wall being reduced in thickness between said groove and the outer end thereof, a hard annular backing member fitted in said recess inwardly of said groove and with the outer portion thereof spaced from the inner face of said wall from said groove to the outer end of said wall and said flexible resilient element functioning to bend inwardly on itself about said groove when moved to closed relation against said seat whereby the outer portion of said element will align with said seat and be impinged between the seat and the outer portion of said backing member.

4. In a valve having a conical valve seat forming a valve port, a closure member mounted in said valve for reciprocatory movement toward and away from said valve seat, said closure member including a flexible resilient element having an opening therethrough providing a peripheral wall, said peripheral wall having a groove in the inner periphery thereof extending completely about the inner face of said wall, a hard backing member fitted in said opening in said resilient element inwardly of said groove and spaced from the inner face of said wall from said groove to the outer end of said wall and said flexible resilient element functioning to bend inwardly on itself about said groove when moved to closed relation against said seat whereby the outer portion of said element will align with said seat and be impinged between the seat and said backing member.

5. In a valve having a frusto-conical valve seat forming a valve port, a closure member having reciprocatory movement toward and away from said valve seat, said closure member including a flexible resilient element providing a peripheral wall, said wall being reduced in thickness from the outer end thereof to substantially medially of the length thereof, a hard annular backing member fitted within said peripheral wall and with the outer portion thereof spaced from the inner face of the reduced portion of said peripheral wall to provide an annular recess therebetween, and said reduced portion of the peripheral wall functioning to bend inwardly when the flexible resilient element is moved to closed relation against said seat whereby the outer portion of said element will align with said seat and be impinged between the seat and the outer portion of said backing member.

JOHN J. DELANY.

REFERENCES CITED

The following references are of record in the file of this patent:

UNITED STATES PATENTS

| Number | Name | Date |
|---|---|---|
| 612,890 | Wood | Oct. 25, 1898 |
| 1,707,017 | Kibele | Mar. 26, 1929 |
| 2,107,200 | Kennon | Feb. 1, 1938 |
| 2,211,167 | Safford | Aug. 13, 1940 |
| 2,260,381 | Kennon | Oct. 28, 1941 |